United States Patent
Wang et al.

(10) Patent No.: US 9,076,217 B2
(45) Date of Patent: Jul. 7, 2015

(54) IMAGE COMPRESSION METHOD AND APPARATUS

(71) Applicant: FUJITSU LIMITED, Kawasaki (JP)

(72) Inventors: Zheng Wang, Shanghai (CN); Jianqing Zhu, Shanghai (CN)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 13/892,707

(22) Filed: May 13, 2013

(65) Prior Publication Data

US 2013/0315497 A1   Nov. 28, 2013

(30) Foreign Application Priority Data

May 24, 2012   (CN) .......................... 2012 1 0171037

(51) Int. Cl.
| | |
|---|---|
| *G06K 9/00* | (2006.01) |
| *G06K 9/36* | (2006.01) |
| *G06K 9/46* | (2006.01) |
| *G06T 9/00* | (2006.01) |
| *H04N 19/15* | (2014.01) |
| *H04N 19/124* | (2014.01) |
| *H04N 19/174* | (2014.01) |
| *H04N 19/426* | (2014.01) |

(52) U.S. Cl.
CPC ................ *G06T 9/008* (2013.01); *H04N 19/15* (2014.11); *H04N 19/124* (2014.11); *H04N 19/174* (2014.11); *H04N 19/428* (2014.11)

(58) Field of Classification Search
CPC .................... H04N 19/0009; H04N 19/00187; H04N 7/26085; H04N 7/26207; G06T 9/008; G06T 9/00

USPC .............................. 382/232, 251; 375/240.03
See application file for complete search history.

(56) References Cited

U.S. PATENT DOCUMENTS

| | | | | |
|---|---|---|---|---|
| 6,798,833 | B2 * | 9/2004 | Lee et al. ................. | 375/240.03 |
| 6,812,865 | B2 * | 11/2004 | Saunders ........................ | 341/51 |
| 7,881,545 | B2 * | 2/2011 | Yamamoto .................... | 382/232 |
| 8,768,086 | B2 * | 7/2014 | Lee et al. ...................... | 382/251 |

OTHER PUBLICATIONS

European Office Action issued Aug. 22, 2013 in corresponding European Application No. 13167930.0.
Extended European Search Report mailed Nov. 19, 2013 for corresponding European Patent Application No. 13 16 7930.

* cited by examiner

*Primary Examiner* — Kanjibhai Patel
(74) *Attorney, Agent, or Firm* — Staas & Halsey LLP

(57) ABSTRACT

A method and apparatus for image compression. The method includes: calculating a total bit length that is needed for compressing any one segment line and an ideal bit length that is needed for compressing any one segment; for each segment in any one segment line, acquiring a quantization parameter and a compression mode for compressing the segment and an actual bit length that is needed for compressing the segment by using the acquired quantization parameter and compression mode; distributing a redundancy bit length of one or more simple segments in the segment line to one or more complex segments in the segment line, and re-acquiring quantization parameters and compression modes for compressing every complex segment of the one or more complex segments; and compressing every segment in the segment line by using the acquired quantization parameters and compression modes.

8 Claims, 2 Drawing Sheets

IMAGE COMPRESSION METHOD AND APPARATUS

CROSS-REFERENCE TO RELATED APPLICATIONS

This application is based upon and claims benefit of foreign priority of Chinese Application No. 201210171037.1, filed May 24, 2012 in the Chinese Intellectual Property Office, the entire contents of which are incorporated herein by reference.

FIELD OF THE INVENTION

The invention relates to image processing, and in particular to an image compression method and apparatus.

BACKGROUND

Currently, as definition of digital video and digital image becomes higher and higher and rate of digital video becomes higher and higher, amount of data to be processed in a digital video/image processing system is becoming larger and larger, and capacity and bandwidth of a memory for storing video/image to be processed and the processed video/image are becoming larger and larger.

Inserting an embedded compressor (i.e., an embedded codec) between a function module (i.e., a video/image processing system) and an on-chip/external memory module is effective in reducing the requirement on the capacity and bandwidth of the memory. Image data to be processed is firstly compressed by the embedded compressor before being transmitted to the memory, and the compressed image data is firstly decompressed by the embedded compressor before being processed by the function module.

Most existing embedded image compression algorithms perform image compression with a fixed compression ratio, and fail to set compression ratios according to various image sizes or applications. Generally, for a high-definition image, it is necessary to perform compression with a high compression ratio; and for a comparative low-definition image, it is enough to perform compression with a lower compression ratio. Further, the compression ratio will influence the quality of a reconstructed image. The lower the compression ratio is, the higher quality of the reconstructed image obtained from decompression would be.

In the image processing system, in order to save the bandwidth and the memory, each request desires to request for useful data only with redundant data reduced to the minimum, which requires compressed data to be capable of being accessed randomly and compression ratio of each compression unit be fixed. In an image, simple and smooth regions are easy to be compressed, a very high compression ratio can be reached, and there would be a lot of redundant bits appearing in the case that the unit length is fixed; complex regions are not easy to be compressed and image quality drops significantly in the case that the unit length is fixed. Therefore, employing a fixed compression ratio for one image cannot improve the compression ratio; instead, it will cause loss in image quality.

The invention distinguishes compression units from accessing units, realizes random access while guaranteeing compression ratio and image quality, and thus reduces cost on the bandwidth and the memory.

SUMMARY OF THE INVENTION

In view of the above problems, the invention provides a novel image compression method and apparatus.

An image compression method in accordance with an embodiment of the invention is used for compressing an image to be compressed in units of segment, wherein all segments in one or more lines in the image to be compressed constitute a segment line. The method comprising: calculating a total bit length that is needed for compressing any one segment line and an ideal bit length that is needed for compressing any one segment; for each segment in any one segment line, acquiring a quantization parameter and a compression mode for compressing the segment and an actual bit length that is needed for compressing the segment by using the acquired quantization parameter and compression mode, wherein a segment whose quantization parameter is not larger than a predetermined threshold in the segment line is called a simple segment, and a segment whose quantization parameter is larger than the predetermined threshold in the segment line is called a complex segment; distributing a redundancy bit length of one or more simple segments in the segment line to one or more complex segments in the segment line, and re-acquiring quantization parameters and compression modes for compressing every complex segment of the one or more complex segments, wherein the redundancy bit length of the one or more simple segments is the sum of bit lengths obtained by subtracting the actual bit lengths from the ideal bit lengths of every simple segment of the one or more simple segments; and compressing every segment in the segment line by using the acquired quantization parameters and compression modes.

An image compression apparatus in accordance with an embodiment of the invention is used for compressing an image to be compressed in units of segment, wherein all segments in one or more lines in the image to be compressed constitute a segment line. The apparatus comprising a bit length calculating unit, a compression parameter acquiring unit, a compression parameter modifying unit, and a compression implementing unit, wherein the bit length calculating unit is used for calculating a total bit length that is needed for compressing any one segment line and an ideal bit length that is needed for compressing any one segment. For each segment in any one segment line, the compression parameter acquiring unit is used for acquiring a quantization parameter and a compression mode for compressing the segment and an actual bit length that is needed for compressing the segment by using the acquired quantization parameter and compression mode, wherein a segment whose quantization parameter is not larger than a predetermined threshold in the segment line is called a simple segment, and a segment whose quantization parameter is larger than the predetermined threshold in the segment line is called a complex segment; the compression parameter modifying unit is used for distributing a redundancy bit length of one or more simple segments in the segment line to one or more complex segments in the segment line, and re-acquiring quantization parameters and compression modes for compressing every complex segment of the one or more complex segments, wherein the redundancy bit length of the one or more simple segments is the sum of bit lengths obtained by subtracting the actual bit lengths from the ideal bit lengths of every simple segment of the one or more simple segments; and the compression implementing unit is used for compressing every segment in the segment line by using the acquired quantization parameters and compression modes.

The invention distinguishes image compression units from accessing units of the compressed image, and it can realize random access in units of random accessing unit on the basis of balancing compression ratio and image quality of smooth regions and complex regions of the image.

DESCRIPTION OF THE DRAWINGS

The invention will be best understood from the following description in combination with the accompanying drawings, wherein.

DETAILED EMBODIMENTS

Next, characteristics and exemplary embodiments of various aspects of the invention will be described in detail. The following description covers many specific details so as to provide comprehensive understanding of the invention. However, it would be obvious for those skilled in the art that the invention can be implemented in absence of some of the specific details. The following descriptions of embodiments merely aim to provide clearer understanding of the invention through illustrating examples of the invention. The invention is not limited to any specific configurations and algorithms provided below; instead, it covers any modification, substitution, and improvement of corresponding elements, components and algorithms without departing from the spirit of the invention.

In hardware design, in order to realize actual bandwidth decreasing, it is necessary to make data to have random accessibility. In this way, any needed part of data can be randomly accessed without decompressing other parts of data, and delay and bandwidth can be minimized through transmitting necessary data only. The image compression method and apparatus in accordance with the invention implement compression on an image in units of segment (i.e., dividing the image to be compressed into a plurality of segments with the same size; and compressing each of the segments respectively). Here, the size and compression ratio of the segments can be set freely by users; and the bit length of the compressed image data corresponding to each segment line (each segment line is constituted of all segments in one line in the image to be compressed) is fixed. Therefore, the image compression method and apparatus in accordance with the invention support random access to the compressed image data in units of segment line.

Figure 1:
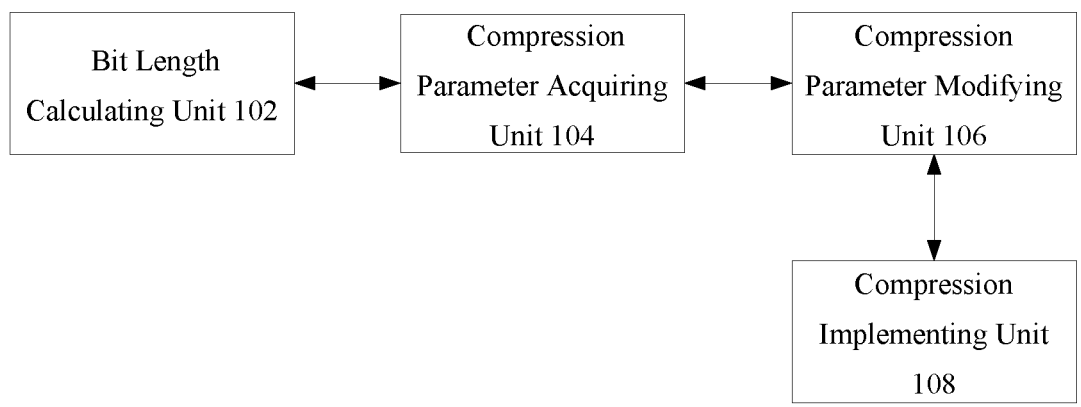
FIG. 1 illustrates a block diagram of an image compression apparatus in accordance with an embodiment of the invention.
Figure 2:
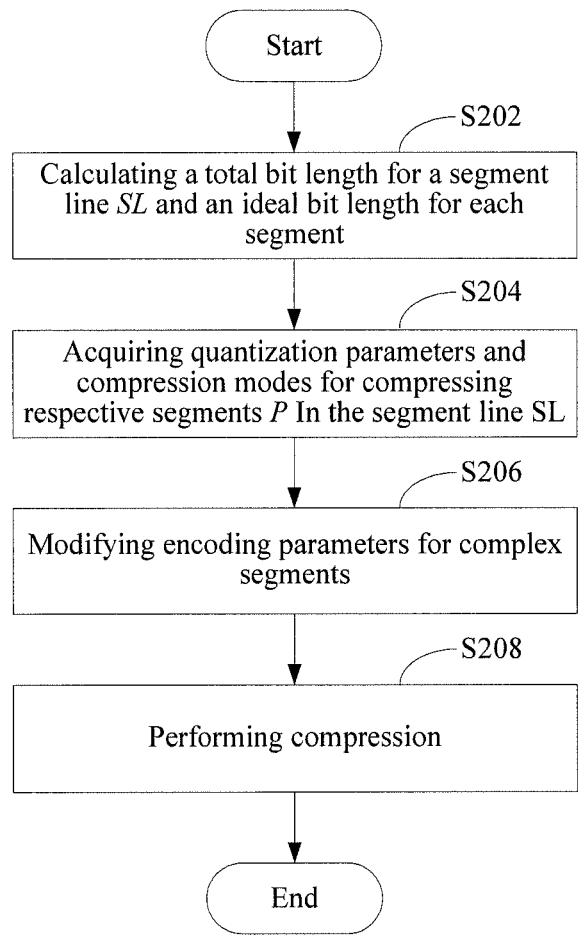
FIG. 2 illustrates a flow chart of an image compression method in accordance with an embodiment of the invention.

FIG. 1 illustrates a block diagram of an image compression apparatus in accordance with an embodiment of the invention. FIG. 2 illustrates a flow chart of an image compression method in accordance with an embodiment of the invention. Below, the image compression apparatus and method in accordance with an embodiment of the invention will be described with reference to FIG. 1 and FIG. 2.

As shown in FIG. 1, the image compression apparatus in accordance with an embodiment of the invention comprises a bit length calculating unit 102, a compression parameter acquiring unit 104, a compression parameter modifying unit 106 and a compression implementing unit 108.

The bit length calculating unit 102 calculates a total bit length that is needed for compressing any segment line "SL" and an ideal bit length that is needed for compressing each segment (i.e., performing step S202). For each segment "P" in the segment line "SL", the compression parameter acquiring unit 104 acquires a quantization parameter and a compression mode for compressing the segment "P" and an actual bit length that is needed for compressing the segment "P" by using the acquired quantization parameter and compression mode (i.e., performing step S204), wherein a segment whose quantization parameter is not larger than a predetermined threshold in the segment line "SL" is called a simple segment and a segment whose quantization parameter is larger than the predetermined threshold in the segment line "SL" is called a complex segment. The compression parameter modifying unit 106 distributes a redundancy bit length of one or more simple segments in the segment line "SL" to one or more complex segments in the segment line "SL", and re-acquires quantization parameters and compression modes for compressing every complex segment (i.e., performing step S206). The redundancy bit length of the one or more simple segments is the sum of bit lengths obtained by subtracting the actual bit lengths from the ideal bit lengths of every simple segment of the one or more simple segments. The compression implementing unit 108 compresses every segment in the segment line "SL" by using the acquired quantization parameters and compression modes (i.e., performing step S208).

Below, specific processing of each unit and step will be described in detail.

I. Calculating a Total Bit Length for the Segment Line "SL" and an Ideal Bit Length for every Segment In the image compression method and apparatus in accordance with an embodiment of the invention, images are compressed in units of segment, wherein the total bit length that is needed for compressing the segment line and the ideal bit length that is needed for compressing each segment are fixed. Before compressing each segment in the image to be compressed, firstly it is necessary to calculate a total bit length that is needed for compressing the segment line "SL" and an ideal bit length that is needed for compressing every segment.

Specifically, for any segment "P" in the segment line "SL", an ideal bit length "SBL" that is needed for compressing the segment P can be calculated in accordance with the following equation:

$$SBL = \lfloor SWidth \times SHeight \times 8 \times CR \rfloor$$

where "SWidth" represents a width (i.e., the number of pixels contained in the segment "P" in the width direction) of the segment "P", "S Height" represents height (i.e., the number of pixels contained in the segment "P" in the height direction) of the segment "P", "CR" represents a compression ratio preset by a user; and "8" is the number of bits needed for coding each pixel. It should be noted that the image to be compressed is divided into a plurality of segments with the same size, thus the ideal bit lengths needed for compressing every segment are the same.

Next, a total bit length "LBL" that is needed for compressing the segment line "SL" in which the segment "P" is located is calculated in accordance with the following equation:

$$LBL = \lceil (IWidth \times SHeight \times 8 \times CR)/8 \rceil 8$$

where "IWidth" represents a width (i.e., the number of pixels contained in the segment line "SL" in the width direction) of the segment line "SL", "IHeight" represents a height of the segment line "SL" (since the segment line "SL" is constituted by a plurality of segments arranged in a line, the height of the segment line "SL" is the height of the segments), "CR" represents the compression ratio preset by a user; and "8" is the number of bits needed for compressing each pixel.

II. Acquiring a Quantization Parameter and a Compression Mode for Compressing each Segment "P" in the Segment Line "SL"

Actual bit lengths that are needed for compressing the segment "P" are calculated with respect to every combination of quantization parameters (QP) and compression modes, and a minimum quantization parameter and its corresponding compression mode that meet the following requirement are selected as the quantization parameter and the compression mode for compressing the segment "P": the actual bit length that is needed for compressing the segment "P" by using the quantization parameter and the compression mode is less than or equal to the ideal bit length of the segment "P". Here, a segment whose quantization parameter is not larger than a predetermined threshold is called a simple segment, and a segment whose quantization parameter is larger than the predetermined threshold is called a complex segment.

In image compression, it is very easy to compress a comparatively smooth segment by using fewer bits, but usually more bits are needed to compress a complex segment. In most cases, the actual bit length of a segment is not necessary to be equal to its ideal bit length; instead, it may be less than the ideal bit length. In embodiments of the invention, high-quality compression of complex segments can be realized through distributing the redundancy bit length of the segments whose actual bit length is less than its ideal bit length in the case that the quantization parameter is not larger than the predetermined threshold in the segment line "SL" (i.e., simple segments) to the segments whose actual bit length is less than its ideal bit length only when the quantization parameter is larger than the predetermined threshold in the segment line "SL" (i.e., complex segments).

III. Coding Parameter Modification for Complex Segments

The redundancy bit length of the one or more simple segments in the segment line "SL" is distributed to the one or more complex segments in the segment line SL, and a quantization parameter and a compression mode for compressing each of the complex segments are re-acquired.

Here, the redundancy bit length of the one or more simple segments is averagely distributed to the one or more complex segments. For any of the one or more complex segments, a minimum quantization parameter and its corresponding compression mode that meet the following requirement are selected as the quantization parameter and the compression mode for compressing the complex segment: the actual bit length that is needed for compressing the complex segment by using the quantization parameter and the compression mode is less than or equal to the sum of the ideal bit length of the complex segment and a redundancy bit length distributed to the complex segment.

It should be noted that if quantization parameters of both complex segments "PC1" and "PC3" obtained through processing (III) are larger than the predetermined Threshold, and quantization parameters of complex segments "PC2", "PC4" and "PC5" are not larger than the predetermined threshold, then redundancy bit lengths of "PC2", "PC4" and "PC5" (i.e., the sum of bit lengths obtained by subtracting the actual bit lengths from the sum of the ideal bit lengths and the redundancy bit lengths distributed to them) can be distributed to "PC1" and "PC3"; and quantization parameters and compression modes for compressing "PC1" and "PC3" are re-determined as above.

IV. Performing Compression Processing

Simple segments are compressed by using the quantization parameters and compression modes for simple segments obtained from processing (II); and complex segments are compressed by using the quantization parameters and compression modes for the complex segments obtained from processing (III).

Below, a procedure of compressing an image to be compressed by using the aforementioned image compression method and apparatus will be described.

Here, it is assumed that the image to be compressed is an 8-bit YUV image having 1920×1080 pixels, the size of the segment line is 1920×1 pixels, the size of the segment is 16×1 pixels, and the compression ratio is 0.6. Detailed compression processing procedure is the following:

1. Calculating an ideal bit length of each segment and a total bit length of each segment line.
   SBL=(16*1*8*0.6) rounded down=76 bits
   LBL=((1920*1*8*0.6)/8) rounded up=9216 bits
2. Selecting quantization parameters and compression modes for segments included in the current segment line one-by-one.

Here, four quantization levels are preset. Level 0 means not quantifying and maintaining the original accuracy; levels 1/2/3 means reducing accuracy so as to reduce the number of bits.

Segment 0: the original data can be compressed to 68 bits using quantization levels 0, which saves 8 bits compared with the ideal bit length.

Segment 1: the original data cannot be compressed to 76 bits using quantization level 0; attempting quantization level 1 and the condition is satisfied, the original data can be compressed to 70 bits with the quantization level 1, which saves 6 bits compared with the ideal bit length.

Segment 2: the original data cannot be compressed to 76 bits or below using any of the quantization levels 0/1/2, and quantization level 3 is employed.

The numbers of bits saved by every quantization level except the quantization level 3 are counted.

If the quantization level 3 exists, the number of bits saved by segments with the quantization levels 0/1/2 (i.e., simple segments) are re-distributed averagely to all segments with the quantization level 3 (i.e., complex segments). Thus the bit length that may be occupied by the segments with the original quantization level 3 changes to (SBL+total number of the saved bits/the number of segments with the quantization level 3). Based on the newly-obtained bit length, quantization levels for the segments with the quantization level 3 are selected again; the above procedure is repeated until there is no segment with the quantization level 3, or that modes of all the segments do not change any more.

If the quantization level 3 does not exist, then segments with the quantization level 2 are optimized according to the above method.

If neither of the quantization levels 2/3 exists, then segments with the quantization level 1 are optimized according to the above method.

If none of the quantization levels 1/2/3 exists, then no optimization is needed to be done.

Segments are compressed one-by-one in accordance with the quantization parameters and the compression modes selected by the aforementioned processing. When the compression of all segments in the segment line is completed, for example, if 9200 bits are used, then "0" is filled in 16 bits at the end to ensure random access.

The invention distinguishes image compression units from accessing units of the compressed image; it can realize random access in units of random accessing unit on the basis of balancing compression ratio and image quality of smooth regions and complex regions of the image.

Although the invention has been described with reference to specific embodiments of the invention, those skilled in the art would understand that modifications, combinations and changes may be done to the specific embodiments without departing from the scope and spirit of the invention as defined by the appended claims and the equivalents thereof.

Hardware or software may be used to perform the steps as required. It should be noted that under the premise of not departing from the scope of the invention, the steps may be amended, added to or removed from the flow diagram provided by the description. Generally, a flow diagram is only one possible sequence of basic operations for implementing functions.

Embodiments of the invention can be implemented by using a general programmable digital computer, a specific integrated circuit, a programmable logic device, a field-programmable gate array, and optical, chemical, biological, quantum or nano-engineering systems, components and institutions. Generally, functions of the invention may be realized by any means known to those skilled in the art. Distributed or networked systems, components and circuits may be used. Data may be transmitted wired, wirelessly, or by any other means.

It shall be realized that one or more elements illustrated in the accompanying drawings may be realized in a more separated or more integrated method, and they would even be allowed to be removed or disabled under some conditions. Realizing programs or codes capable of being stored in a machine readable media so as to enable a computer to perform the aforementioned method also fails within the spirit and scope of the invention.

Additionally, any arrows in the accompanying drawings shall be regarded as being exemplary rather than limiting. And unless otherwise indicated, combinations of components and steps shall be regarded as being recorded when terms are foreseen as leading unclearity to the ability for separating or combining.

What is claimed is:

1. An image compression method for compressing an image to be compressed in units of segment and constituting a segment line by using all segments in one or more lines in the image to be compressed according to a predetermined setting, the method comprising:

calculating a total bit length that is needed for compressing a segment line and calculating an ideal bit length that is needed for compressing a segment in the segment line;

acquiring a quantization parameter and a compression mode for compressing the segment and an actual bit length that is needed for compressing the segment by using the acquired quantization parameter and compression mode, wherein a segment whose quantization parameter is not larger than a predetermined threshold in the segment line is called a simple segment, and a segment whose quantization parameter is larger than the predetermined threshold in the segment line is called a complex segment;

distributing a redundancy bit length of one or more simple segments in the segment line to one or more complex segments in the segment line, and re-acquiring quantization parameters and compression modes for compressing every complex segment of the one or more complex segments, wherein the redundancy bit length of the one or more simple segments is the sum of bit lengths obtained by subtracting the actual bit lengths from the ideal bit lengths of every simple segment of the one or more simple segments; and compressing every segment in the segment line by using the acquired quantization parameters and compression modes.

2. The image compression method of claim 1, wherein the processing of acquiring a quantization parameter and a compression mode for compressing a segment in the segment line comprises:

calculating actual bit lengths that are needed for compressing the segment by using every combination of quantization parameters and compression modes;

selecting a minimum quantization parameter and its corresponding compression mode that meet the following requirement as the quantization parameter and the compression mode for compressing the segment, the actual bit length that is needed for compressing the segment, by using the quantization parameter and the compression mode, is smaller than or equal to the ideal bit length of the segment.

3. The image compression method of claim 1, further comprising averagely distributing the redundancy bit length of the one or more simple segments to the one or more complex segments.

4. The image compression method of claim 3, wherein for a complex segment in the one or more complex segments, selecting a minimum quantization parameter and its corresponding compression mode that meet the following requirement as the quantization parameter and the compression mode for compressing the complex segment, the actual bit length that is needed for compressing the complex segment, by using the quantization parameter and the compression mode, is smaller than or equal to the sum of the ideal bit length of the complex segment and a redundancy bit length distributed to the complex segment.

5. An image compression apparatus for compressing an image to be compressed in units of segment and constituting a segment line by using all segments in one or more lines in the image to be compressed according to a predetermined setting, the apparatus comprising a bit length calculating unit, a compression parameter acquiring unit, a compression parameter modifying unit, and a compression implementing unit, wherein:

the bit length calculating unit is used for calculating a total bit length that is needed for compressing a segment line and calculating an ideal bit length that is needed for compressing a segment in the segment line;

the compression parameter acquiring unit is used for acquiring a quantization parameter and a compression mode for compressing the segment and an actual bit length that is needed for compressing the segment by using the acquired quantization parameter and compression mode, wherein a segment whose quantization parameter is not larger than a predetermined threshold in the segment line is called a simple segment, and a segment whose quantization parameter is larger than the predetermined threshold in the segment line is called a complex segment;

the compression parameter modifying unit is used for distributing a redundancy bit length of one or more simple segments in the segment line to one or more complex segments in the segment line, and re-acquiring quantization parameters and compression modes for compressing every complex segment of the one or more complex segments, wherein the redundancy bit length of the one or more simple segments is the sum of bit lengths obtained by subtracting the actual bit lengths from the ideal bit lengths of every simple segment of the one or more simple segments; and the compression implementing unit is used for compressing every segment in the segment line by using the acquired quantization parameters and compression modes.

6. The image compression apparatus of claim 5, wherein the compression parameter acquiring unit acquires a quantization parameter and a compression mode for compressing a segment in the segment line by the following processing:

calculating actual bit lengths that are needed for compressing the segment by using every combination of quantization parameters and compression modes;

selecting a minimum quantization parameter and its corresponding compression mode that meet the following requirement as the quantization parameter and the compression mode for compressing the segment, the actual bit length that is needed for compressing the segment, by using the quantization parameter and the compression mode, is smaller than or equal to the ideal bit length of the segment.

7. The image compression apparatus of claim 5, wherein the compression parameter modifying unit averagely distributes the redundancy bit length of the one or more simple segments to the one or more complex segments.

8. The image compression apparatus of claim 7, wherein for a complex segment in the one or more complex segments, the compression parameter modifying unit selects a minimum quantization parameter and its corresponding compression mode that meet the following requirement as the quantization parameter and the compression mode for compressing the complex segment, the actual bit length that is needed for compressing the complex segment, by using the quantization parameter and the compression mode, is smaller than or equal to the sum of the ideal bit length of the complex segment and a redundancy bit length distributed to the complex segment.

\* \* \* \* \*